May 26, 1964     H. FRITZ     3,134,277
MACHINE TOOL
Filed Dec. 7, 1961     2 Sheets-Sheet 1

INVENTOR.
HANS FRITZ
BY *Dicke and Craig*
ATTORNEYS.

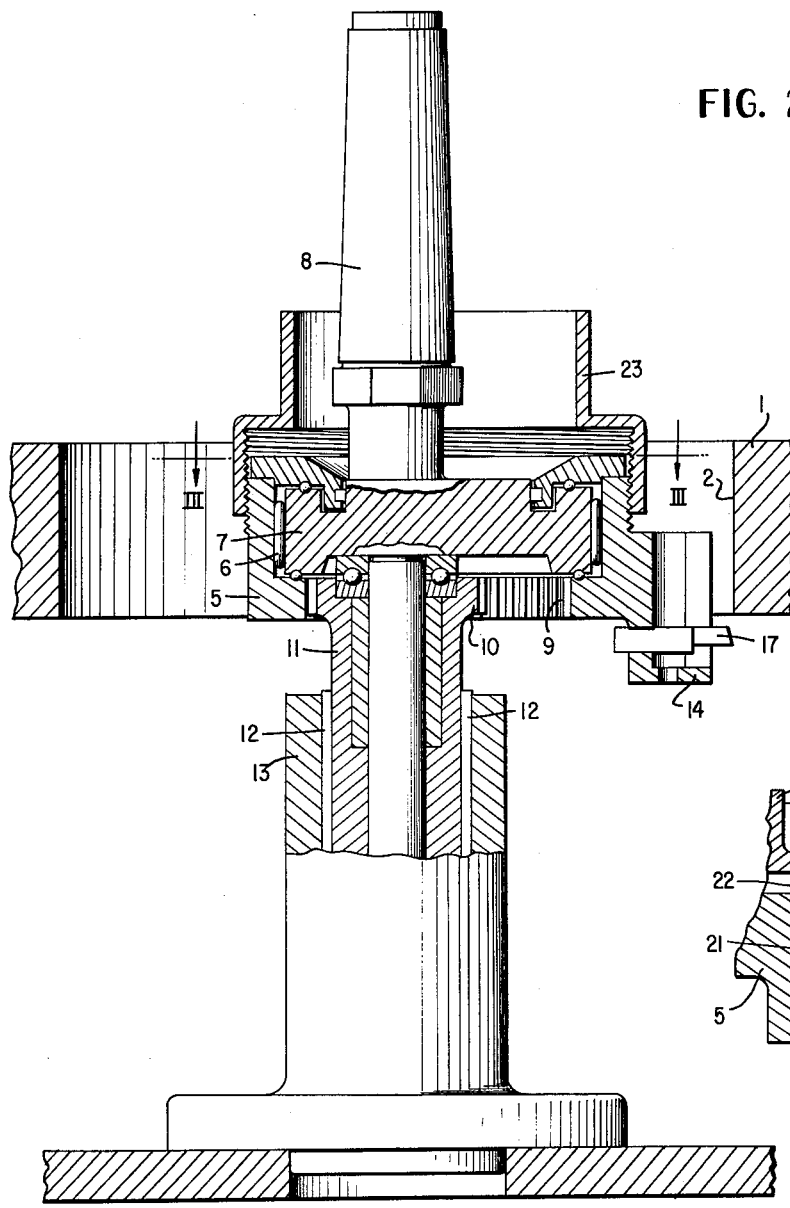
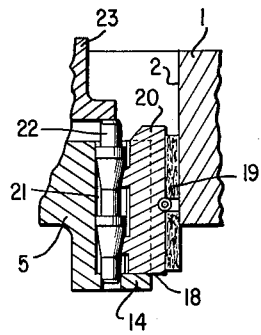

United States Patent Office 3,134,277
Patented May 26, 1964

3,134,277
MACHINE TOOL
Hans Fritz, Stuttgart-Bad Cannstatt, Germany, assignor to Daimler-Benz Aktiengesellschaft, Stuttgart-Unterturkheim, Germany
Filed Dec. 7, 1961, Ser. No. 157,665
5 Claims. (Cl. 77—61)

The present invention relates to an arrangement for machining a cylindrical surface within a housing for rotary-piston internal combustion engines, for example, for internal combustion engines as described in the publication VDI-Z, volume 102, No. 8, of March 11, 1960, pages 293 to 322, the cross sectional shape of which, constituted by a polygon of arches or curves is determined by a piston moved relative to the housing by means of a drive mechanism, such as a driving gear mechanism, whereby the contour of the piston forms the internal envelope boundary of all positions of the housing relative to the piston or the arches or curves of the housing surface form the envelope boundaries of all positions of the piston.

The present invention essentially consists in providing a work tool holder which is driven by a transmission identical with the drive mechanism of the piston of the internal combustion engine and at which there is arranged the work tool, for example, a cutting tool, in at least one place which corresponds to the place of the piston contour most remote from the longitudinal axis of the piston.

It is possible by the use of the present invention to machine with relatively simple means surfaces constituted in cross section by a polygon of arches or curves within housings of rotary-piston internal combustion engines from the blank of the housing for example, up to the grinding dimension or directly up to the finished dimension in an economic and accurate manner.

According to a further feature of the present invention, with an installation for machining surfaces of trochoidal shape in cross section, the tool holder may be supported on the eccentric of a drive shaft and may be moved by means of a gear drive mechanism relative to the rotary speed of the drive shaft whereby the eccentricity of the support of the tool holder corresponds to the eccentricity of the trochoidal shape and the rotational speed ratio of drive shaft to tool holder is determined by the formula $$\frac{n+1}{n}$$

in which $n$ is the number of arches of a surface of epitrochoidal shape in cross section within the housing with a piston forming an internal envelope form or the number of the arches of a surface of hypotrochoidal shape in cross section within the housing which forms the outer envelope form with respect to the piston, or in which $n$ is the number of arches of a piston forming an outer envelope form with a surface of epitrochoidal shape in cross section or the number of arches at a piston forming an internal envelope form with a surface of hypotrochoidal shape in cross section.

In a particularly advantageous manner, tools corresponding to the number and position of the corners of the internal envelope form may be arranged at the tool holder with an installation for machining surfaces of epitrochoidal shape in cross section within housings for multi-cornered or polygonal pistons as internal envelope forms.

Cutting tools may be arranged at the tool holder which, according to still a further feature of the present invention may be arranged one behind the other in staggered relationship.

Honing tools may also be secured at the tool holder, and tool carriers arranged at the tool holder may be so constructed and arranged that different tools, for example, either cutting tools or honing tools may be secured at the tool holder interchangeably and adjustably.

The gear drive mechanism may consist of an internally-toothed gear wheel arranged concentrically at the tool holder and of a pinion meshing therewith which is prevented from rotation. The pinion may thereby be secured on a shaft which is disposed coaxially to the drive shaft.

Accordingly, it is an object of the present invention to provide a machine tool for machining the internal surfaces of the housing of a rotary-piston internal combustion engine, particularly of the type having a trochoidal cross section, which is simple in construction and permits the attainment of a high degree of accuracy.

Another object of the present invention resides in the provision of a machine tool for machining the surfaces of a housing forming part of a rotary-piston internal combustion engine in which the surfaces of the housing may be cut directly up to the grinding dimension thereof or also directly up to the finished dimension thereof.

Another object of the present invention resides in the provision of a machine tool for machining the surfaces of the housing of a rotary piston internal combustion engine, particularly of the type which has a surface of trochoidal shape, which is provided with a tool holder that permits ready interchange of the work tools as well as easy readjustment of the different tools.

These and other objects, features and advantages of the present invention will become more obvious from the following description, when taken in connection with the accompanying drawing which shows, for purposes of illustration only, one embodiment for the machining of the housing of a rotary piston internal combustion engine in which the housing has a cylindrical surface consisting of a two-arched epitrochoidal in cross section and in which a piston provided with three corners is present as internal envelope form, and wherein—

FIGURE 2 is a longitudinal cross sectional view through a machine tool in accordance with the present invention for machining the housing of FIGURE 1;

FIGURE 4 is a tool carrier at the tool holder provided with a honing tool for use in the machine tool according to the present invention.

Figure 1:
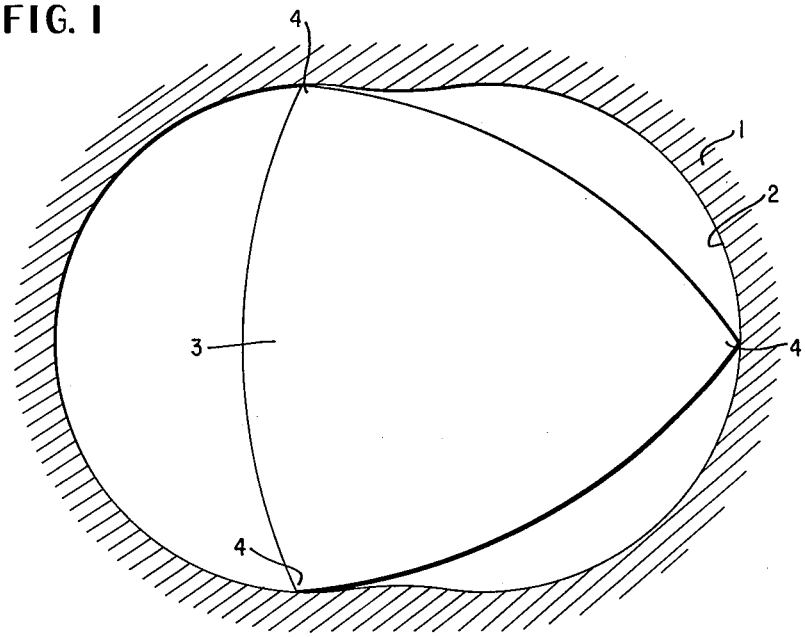
FIGURE 1 is a schematic cross sectional view through the housing of a rotary piston internal combustion engine provided with the piston arranged therein.

Referring now to the drawing wherein like reference numerals are used throughout the various views to designate corresponding parts, and more particularly to FIGURE 1, reference numeral 1 designates therein the housing of a rotary-piston internal combustion engine. Within the housing 1, there is arranged the cylindrical cam track 2 formed of two epitrochoidally-shaped arches in cross section for the three-cornered piston 3 as internal envelope form. The piston is supported, in a manner known per se, on the eccentric of a drive shaft. The rotary movement of the piston about the eccentric is achieved by a stationary externally toothed pinion which meshes with an internally toothed gear rigid at the piston. The piston moves relative to the eccentric with ⅔ of the angular velocity of the drive shaft. The pitch diameter and the number of teeth of the internally toothed gear and of the pinion bear to each other a ratio of 3:2. The three corners 4 of the piston 3 abut, in each position of the piston 3, against the cam track 2 within the housing 1.

In order to be able to machine the cam track 2 economically and accurately from the blank of the housing up to, for example, the grinding dimension thereof or also up to the finished dimension thereof, there is provided a machine tool installation in accordance with the present invention illustrated in FIGURE 2. This arrangement consists of the tool carrier 5 which is arranged on the eccentric 7 of the drive shaft 8 by means of needle bearing 6. The eccentricity of the tool carrier or tool holder to the drive shaft corresponds to the eccentricity allowed for in the construction of the epitrochoidally-shaped cam track 2 within the housing 1. The drive shaft 8 is driven in any suitable manner such as, for example, by a horizontal or vertical boring mill or a vertical milling machine. For purposes of achieving a movement of the tool holder 5 within the clamped or chucked housing 1 which corresponds to the movement of the piston 3 (FIG. 1), the tool holder 5 is provided with the internally toothed gear 9 with which meshes the pinion 10. The gear 9 is arranged concentrically at the tool holder 5 whereas the pinion 10 is arranged coaxially to the drive shaft 8 on the shaft or spindle 11. As with the drive mechanism of the piston, care must be taken with the toothed arrangement 9, 10 that the center of a tooth and the center of a tooth gap lie on an axis which extends through the axis of the drive shaft and the axis of the eccentric. The shaft 11 is provided with longitudinal splines 12 which engage into corresponding spline grooves provided in the part 13 fixed to the work tool so that the pinion 10 is prevented against rotation.

Figure 3:
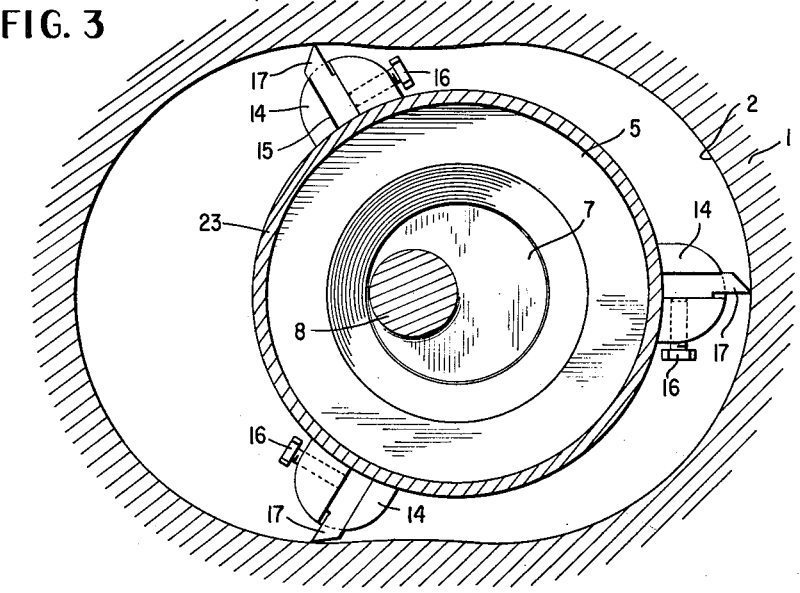
FIGURE 3 is a cross sectional view taken along line III—III of FIGURE 2.

Corresponding to the three corners 4 of the piston 3 (FIG. 1), the tool holder 5 is provided, as is clearly visible also from FIGURE 3, with three tool carriers 14. Cutting tools 17 are arranged in radial bores 15 which are secured within the tool carriers 14 by means of screws 16. The cutting tips of the cutting tools 17 are disposed exactly at the axes corresponding to the corners 4 of the piston 3 and at those places which correspond to the places of the piston contour furthest removed from the longitudinal axis of the piston. The cutting tools 17 are further disposed staggered in the axial direction of the tool holder 5 one behind the other so that with a movement of the housing 1 against the tool holder 5 at first the first cutting tool, then the second cutting tool and thereupon the third cutting tool begin to operate. Of course, the cutting tools also project different amounts in the radial direction in such a manner that the last engaging cutting tool machines the housing to the desired dimension such as the finished dimension so that the cam track only has to be ground or honed thereafter.

FIGURE 4 shows how the tool carriers 14 may be equipped with a longitudinal groove 18 for the accommodation of the carrier 19 of the honing stone 20 and with a longitudinal bore 21 for the accommodation of a conical readjustment piece 22. The readjusting pieces 22 may be displaced in the axial direction by the adjusting nuts 23 supported at the tool carrier 14 by means of a thread and the honing stones 19 are therewith forced outwardly in the radial direction. The honing stones 19 again are disposed at the places corresponding to the corners 4 of the piston 3.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. An arrangement for machining a cylindrical surface within a housing for a rotary piston internal combustion engine, the trochoidal cross sectional shape of which, constituted by a polygon of arches is determined by a piston actuated relative to the housing by a drive mechanism, whereby the contour of the piston forms the internal envelope boundary of all positions of the housing relative to the piston or the arches of the housing surface form the envelope boundaries of all positions of the piston, comprising tool holder means, drive means operatively connected with said tool holder means for driving said tool holder means in a manner identical to the movement of the piston by said drive mechanism including a drive shaft provided with an eccentric, support means for supporting said tool holder means on said eccentric, and gear means operatively connecting said drive shaft with said tool holder means, and tool means arranged in at least one place of said tool holder means which corresponds to the place of the piston contour most remote from the longitudinal axis of the piston, the eccentricity of the support of said tool holder means corresponding to the eccentricity of said trochoidal shape, and said gear means providing a rotational speed ratio of drive shaft to tool holder means corresponding to $$\frac{n+1}{n}$$

in which $n$ is the number of arches of a surface of epitrochoidally-shaped cross section within the housing with a piston forming an internal envelope form on the number of arches with a hypotrochoidally-shaped surface within the housing which forms to outer envelope form with respect to the piston, or in which $n$ is the number of arches at a piston forming an outer envelope form with a surface of epitrochoidally-shaped cross section or the number of arches at a piston forming an internal envelope form with a surface of hypotrochoidally-shaped cross section.

2. An arrangement for machining a cylindrical surface of epitrochoidal cross section within a housing for a rotary piston internal combustion engine having a polygonal piston as internal envelope form, the epitrochoidal cross sectional shape of which, constituted by a polygon of arches is determined by the piston actuated relative to the housing by a drive mechanism, whereby the contour of the piston forms the internal envelope boundary of all positions of the housing relative to the piston or the arches of the housing surface form the envelope boundaries of all positions of the piston, comprising tool holder means, drive means operatively connected with said tool holder means for driving said tool holder means in a manner identical to the movement of the piston by said drive mechanism including a drive shaft provided with an eccentric, support means for supporting said tool holder means on said eccentric, and gear means operatively connecting said drive shaft with said tool holder means, and tool means arranged in at least one place of said tool holder means which corresponds to the place of the piston contour most remote from the longitudinal axis of the piston, the eccentricity of the support of said tool holder means corresponding to the eccentricity of said trochoidal shape, and said gear means providing a rotational speed ratio of drive shaft to tool holder means corresponding to $$\frac{n+1}{n}$$

in which $n$ is the number of arches of a surface of epitrochoidally-shaped cross section within the housing with a piston forming an internal envelope form.

3. An arrangement for machining a cylindrical surface within a housing for a rotary piston internal combustion engine according to claim 2, further comprising cutting tool means, including said first-named tool means, disposed in staggered relationship one behind the other in the axial direction of said tool holder means.

4. An arrangement for machining a cylindrical surface within a housing for a rotary piston internal combustion engine according to claim 2, wherein said gear means includes internally toothed gear means substantially concentrically arranged at said tool holder means, and pinion means meshing with said internally toothed gear means, said pinion means being provided with means effectively preventing rotary movement thereof.

5. An arrangement for machining a cylindrical surface within a housing for a rotary piston internal combustion engine according to claim 2, wherein said tool holder means includes tool carrier means for adjustably and interchangeably securing different tools at said tool holder means.

References Cited in the file of this patent

UNITED STATES PATENTS

| | | |
|---|---|---|
| 473,027 | Smith | Apr. 19, 1892 |
| 2,263,788 | Schroder | Nov. 25, 1941 |
| 2,445,277 | Mitchell | July 13, 1948 |